July 7, 1970  B. I. DAVIS ET AL  3,518,934
CONTINUOUS PROCESSING APPARATUS FOR LINKED SAUSAGES
Filed Oct. 22, 1968  3 Sheets-Sheet 3
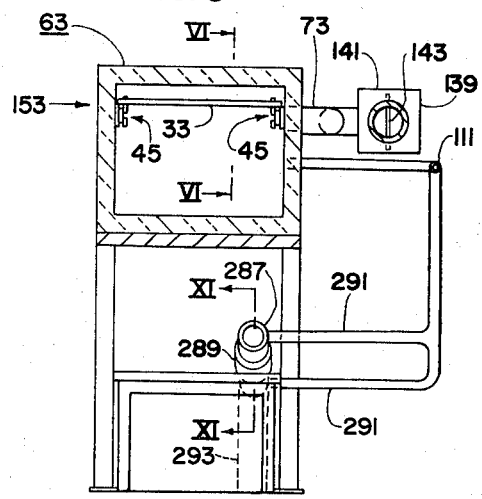
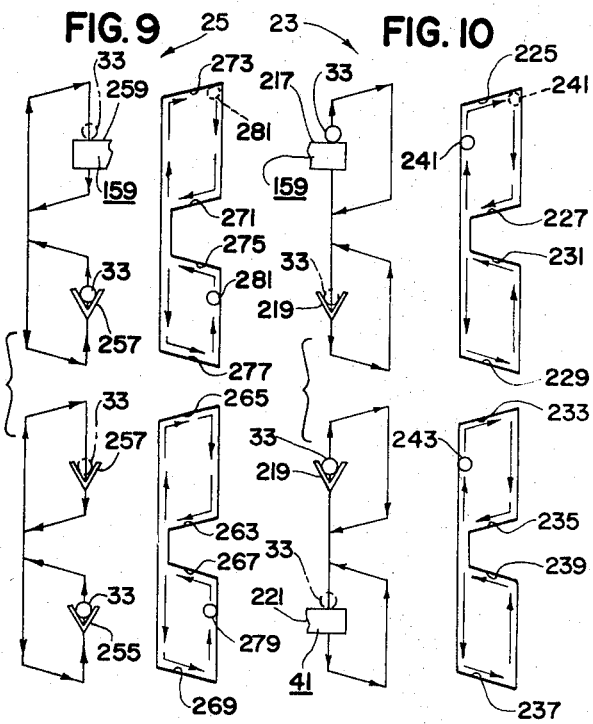
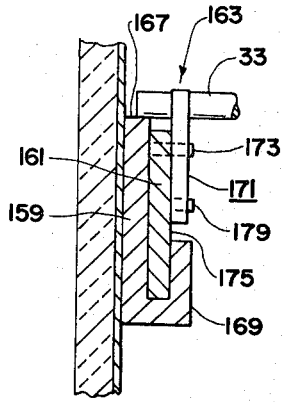
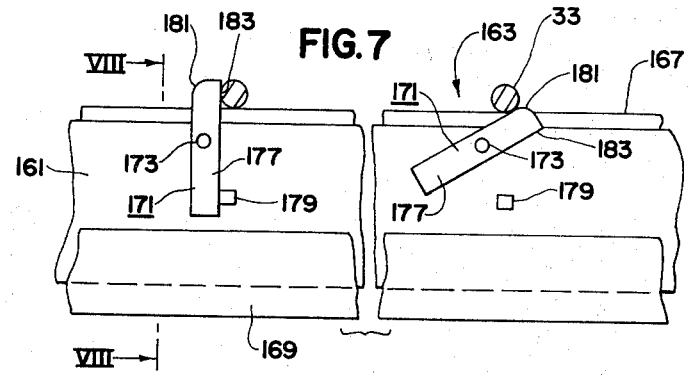
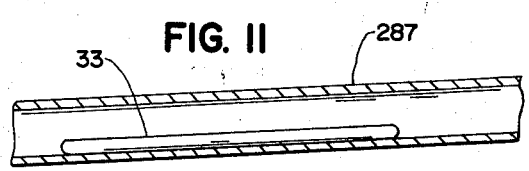
INVENTORS
BENJAMIN I. DAVIS
THOMAS A. KLYCE
BY
John R. Walker
Attorney

United States Patent Office 3,518,934
Patented July 7, 1970

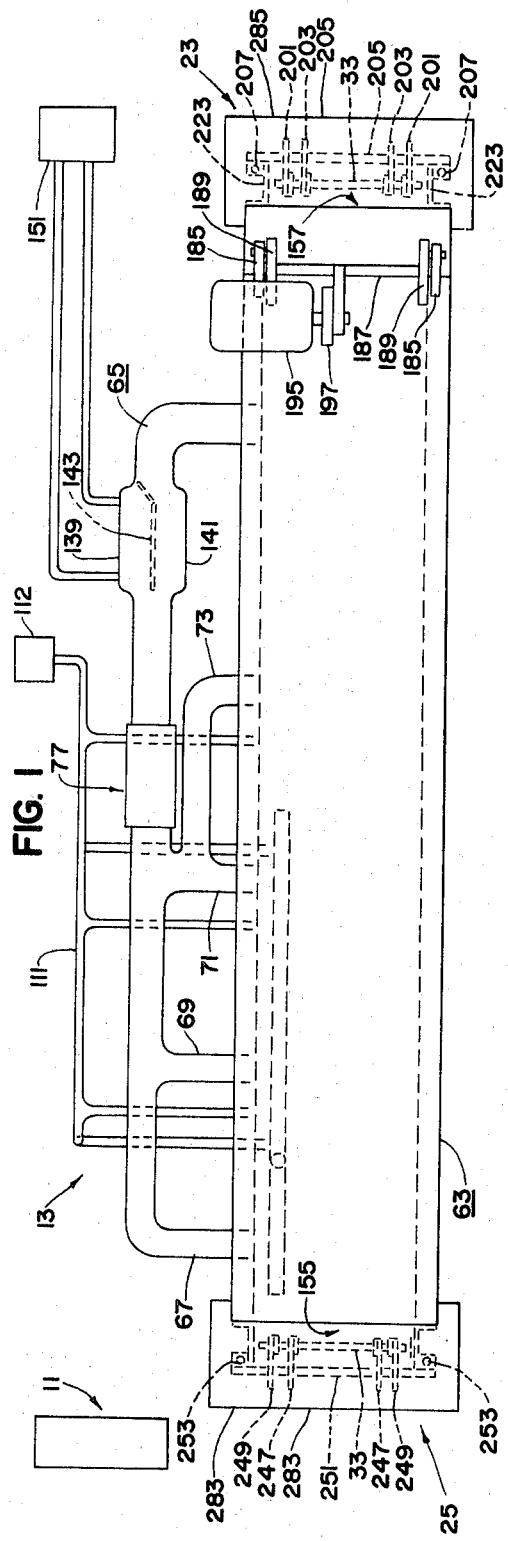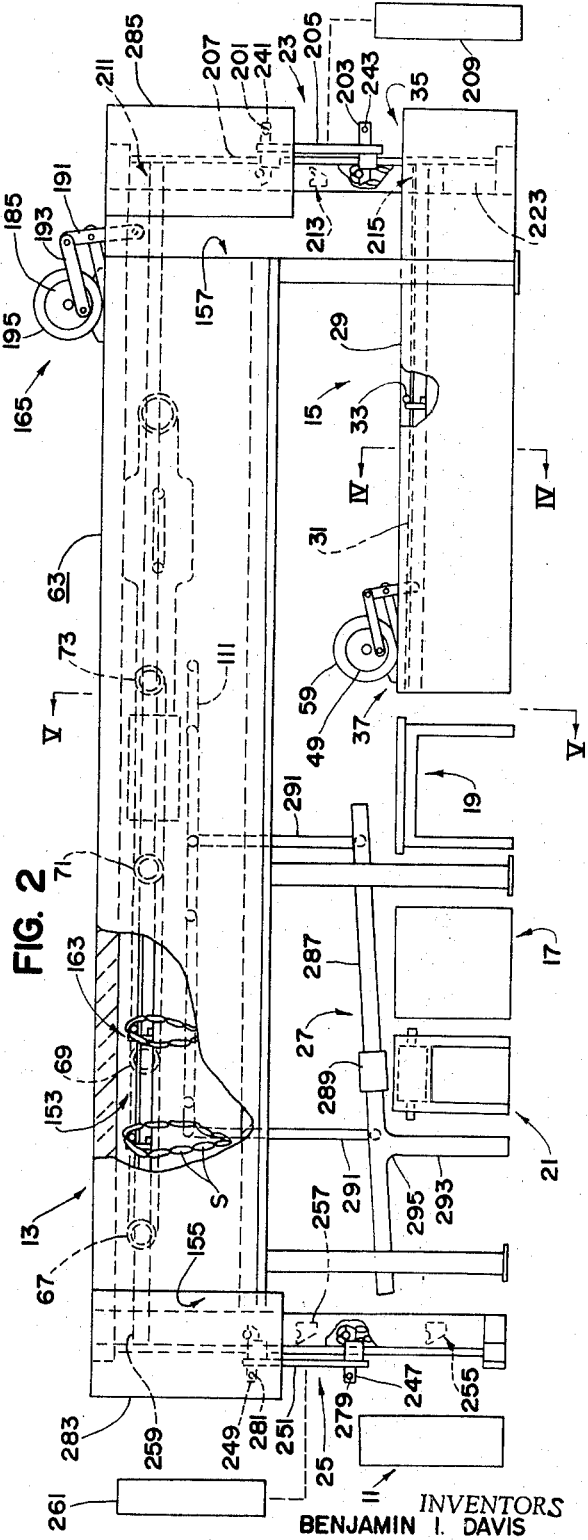

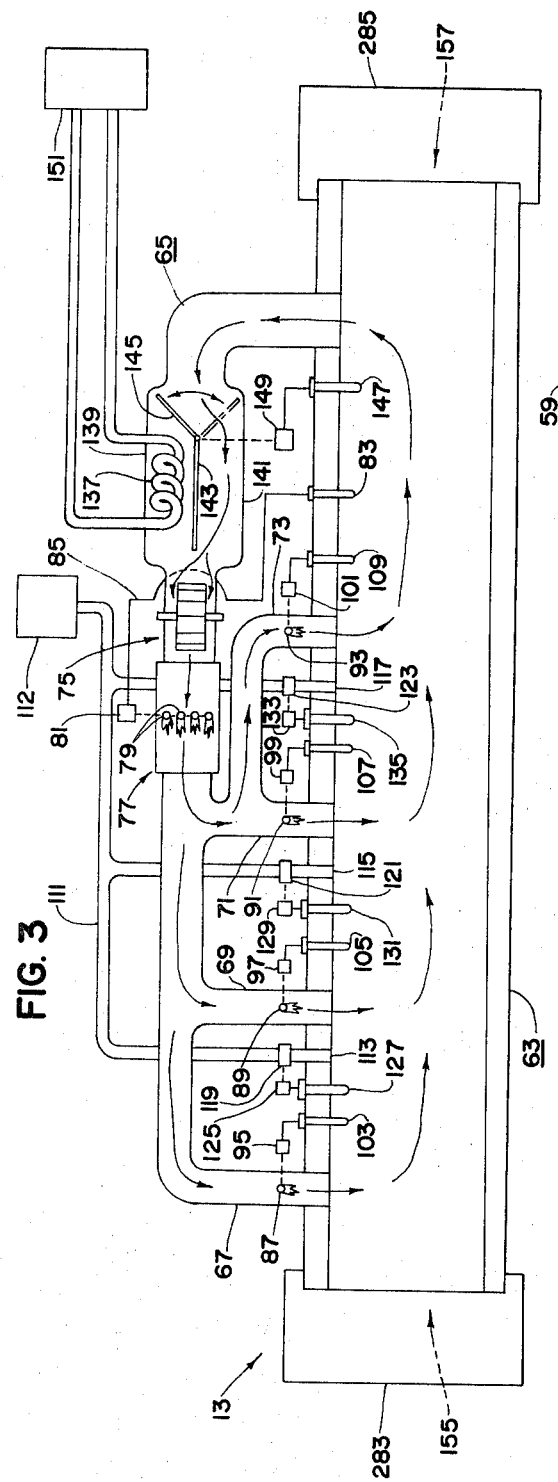

3,518,934
CONTINUOUS PROCESSING APPARATUS FOR LINKED SAUSAGES
Benjamin I. Davis, Ellendale, and Thomas A. Klyce, Memphis, Tenn., assignors to Ranger Tool Co., Inc., Ellendale, Tenn., a corporation of Tennessee
Filed Oct. 22, 1968, Ser. No. 769,526
Int. Cl. A23j 3/00
U.S. Cl. 99—443                                                    16 Claims

ABSTRACT OF THE DISCLOSURE

The apparatus including a long sausage cooking tunnel unit having a series of cooking zones of conditioned air with each cooking zone having heat and humidity control means for maintaining the heat and humidity of each conditioned air zone at a desired range. The apparatus including a long sausage cooling tank unit arranged underneath the cooking tunnel unit and includes conveyor means in the cooking unit and cooling unit with the conveyor means having a ratchet-like action or an intermittently operative action for conveying the linked sausages supported on a sausage rod through the sausage cooking unit and cooling unit. The apparatus also includes conveyor means including lowering mechanism having an intermittently operative action for lowering the sausage laden sausage rods from the outfeed end of the cooking unit to the infeed end of the sausage cooling unit.

CROSS REFERENCE TO RELATED APPLICATION

This application relates to or is an improvement on the apparatus disclosed in an application filed June 6, 1968; Ser. No. 735,033, now Pat. No. 3,482,417, entitled Apparatus for Chilling Sausage Links.

BACKGROUND OF THE INVENTION

Field of the invention

The invention relates to food processing generally and particularly relates to production line manufacturing processes utilized for cooking and processing link sausages, frankfurters or the like.

Description of the prior art

Heretofore, in link sausage manufacture, a typical practice has been to take the link sausages from a linking machine and loop the sausages on a moving conveyor moving through a cooking room. The typical sausage cooking room is of substantially large volume and is difficult to heat uniformly or to maintain uniform heat throughout the various levels or elevations of the cooking room. In certain sausage processing installations, the sausage chain is looped or draped over a sausage rod or stick which in turn is carried into the cooking room and supported on racks or trees during the cooking process. Whether the sausage links are conveyed through the cooking room on a conveyor or are supported stationarily on racks or trees, it is difficult to properly uniformly cook the sausage links which results in certain sausages being overly cooked and others being not cooked sufficiently. Moreover, it is difficult to control or introduce steam or humidity into the cooking room in a uniform distribution and this results in the sausages not being of a correct or preferred color or texture and also the humidity is critical relative to the peelability of sausages. A large portion of the sausages produced in the sausage industry are peeled or sold as skinless sausages or frankfurters. Improper humidity control in the cooking room results in the sausages being difficult to peel or skin and often results in substantial waste in the sausage products.

A further undesirable feature of the previous practice of cooking sausages in a cooking room is that a rather large number of workmen are needed, particularly if the sausage processing installation is of considerable size. A further undesirable feature in cooking sausages in a cooking room is the substantial amount of floor space or factory area needed for housing the cooking room or the rather large amount of factory space utilized for the cooking process of the sausages.

Another undesirable feature of cooking sausages in a cooking room or processing sausages in such manner is the rather long period of time required in cooking, cooling and processing the sausages. In the prior art manufacturing processes, it is not unusual for a period of twenty-four hours to elapse between the sausage stuffing-linking operation and the sausage packaging operation; in prior art practice a substantial amount of sausage processing time was utilized in handling or manually conveying the sausages from one process to another process, as for example, between the linker-stuffer and the cooking unit, or between the cooking unit and the sausage cooling unit or between the cooling unit and the sausage peeling unit.

SUMMARY OF THE INVENTION

The invention is directed toward providing means for continuous processing of linked sausages from the linker-stuffer unit to the peeler unit. The sausage processing apparatus is adapted to utilize the typical sausage stick or rod for conveying the sausages throughout the cooking and cooling units. The sausage rods are adapted to be loaded with sausages and conveyed by intermittent action conveying means through the cooking unit and cooling unit. Moreover, the cooking unit includes a cooking tunnel and means for recirculating the cooking air cyclically through the tunnel. Sensitive humidity and heat control means are provided for conditioning the cooking air of the cooking tunnel and for accurately obtaining and maintaining the humidity and heat at a desired range as the sausages are intermittently conveyed on the sausage rods through the cooking tunnel. Accurately controlled humidity during the cooking of the sausages results in uniform color and texture of sausages and increases substantially the ease and effectiveness of the sausage peeling operation. The use of the apparatus of the present invention reduces substantially the time heretofore required in cooking and processing linked sausages and results in a more uniform and marketable product. The number of workmen required for processing the sausages is substantially less than that required in many prior art sausage processing practices. The sausage processing apparatus is rather compact in design which results in less floor space or factory area required for installation of the apparatus.

BRIEF DESCRIPTION OF THE DRAWING

FIG. 1 is a top plan view of the apparatus of the present invention.

FIG. 2 is a side elevational view of the apparatus of FIG. 1.

FIG. 3 is a schematic illustration of the apparatus particularly illustrating the air flow through the cooking unit of the apparatus.

FIG. 4 is a vertical plane view taken transversely of the cooling unit taken as on the line IV—IV of FIG. 2.

FIG. 5 is a vertical plane transverse view of the cooking unit taken as on the line V—V of FIG. 2.

FIG. 6 is a schematic showing of the cooking unit conveyor taken substantially as on the line VI—VI of FIG. 5.

FIG. 7 is an enlarged schematic showing of the cooking unit conveyor means taken as from FIG. 6.

FIG. 8 is a vertical sectional view taken as on the line VIII—VIII of FIG. 7.

FIG. 9 schematically illustrates vertical conveying means for raising the sausage rods to the infeed portion of the cooking unit.

FIG. 10 schematically illustrates vertical conveying means for lowering the sausage rods from the outfeed end of the cooking unit to the infeed end of the cooling unit.

FIG. 11 illustrates sausage rod transferring means taken as on the line XI—XI of FIG. 5.

DESCRIPTION OF THE PREFERRED EMBODIMENT

FIGS. 1 and 2 illustrate substantially a complete sausage processing factory including components sequentially arranged for production line processing of the sausages including a linker-stuffer machine 11, a cooking unit 13, a cooling unit 15, a sausage peeling machine 17, a table 19 arranged between cooking unit 15 and peeling machine 17, and belt conveyor means 21 adapted for conveying the skinless sausage product to a product packaging section of the factory.

Those parts of the sausage processing factory apparatus considered to be included in this invention mainly include the structure of cooking unit 13, a cooling unit 15, a lowering conveyor 23, a raising conveyor 25, and sausage rod transfer tube means 27. Cooling unit 15 per se is not considered inventive structure in this specification, as a unit of like construction was the subject matter of the above mentioned earlier filed application entitled "Apparatus for Chilling Sausage Links." Cooling unit 15, however, is considered to be inventive in combination with cooking unit 13, lowering conveyor 23, raising conveyor 25 and sausage rod transfer means 27. The combination of cooking unit 13, cooling unit 15, and lowering and raising conveyors 23, 25 and rod transfer means 27 is considered to be an inventive combination constituting structure resulting in a continuous processing of link sausages.

Cooling unit 15 preferably is of the same construction as defined in the earlier filed application entitled "Apparatus for Chilling Sausage Links" and reference may be had to that specification for specific construction details of cooling unit 15. Cooling unit 15 includes a generally rectangular tank 29 adapted to be filled with a liquid cooling medium M (see FIG. 4). Intermittently operative or ratchet action operative conveyor means 31 is adapted for conveying a parallel arranged series of sausage rods 33 horizontally through tank 29 and from infeed end 35 to outfeed end 37 of the cooling tank.

A pair of side rails 41 having upwardly facing coplanar arranged slide surfaces 43 is adapted to supportingly engage opposite end portions respectively of sausage rods 33 during horizontal conveying movement of the sausage rods through the tank. A series of pairs of pawl mechanisms 45 pivotally mounted respectively on paired pitman bars 47 are adapted to intermittently engage opposite end portions of each sausage rod 33 and to convey the sausage rod along side rails 41. Cooling unit 15 includes means for moving pitman bars 47 simultaneously equidistantly back and forth for movement of pawl mechanisms 45 and for relaying sausage rods 33 successively from a pair of mechanisms 45 to a succeeding pair of pawl mechanisms. The actuating means for reciprocatingly moving paired pitman bars 47 preferably includes a pair of bell crank members 49 relatively fixedly secured on opposite end portions of a horizontal shaft 51 journalled at opposite end portions in bearings 53. Paired rocker arms 55 and link members 57 operatively interconnect paired pitman bars 47 and crank members 49. Simultaneous rotation of crank members 49 operative through rocker arm and link members 55, 57 cause simultaneous equidistant reciprocating movement of the series of pairs of pawl mechanisms 45 for relaying movement of each sausage rod from one pair of pawl mechanisms to a succeeding pair of pawl mechanisms throughout the horizontal extension of cooling tank 29. Motor means 59 operative through power transmission means 61 drive bell crank members 49 for reciprocating movement of pawl mechanisms 45.

Each sausage rod 33 is adapted to be loaded with a chain of linked sausages S and intermittently conveyed horizontally through tank 29 with sausages S submerged in cooling medium M and from infeed end 35 to outfeed end 37 of cooling tank 29. Cooling unit 15 preferably includes refrigeration coil elements (not shown) for refrigerating cooling medium M and also includes pump and liquid flow conduit means (not shown) for moving cooling medium M contained in the tank.

Cooking unit 13 includes a long rectangular sectioned cooking tunnel 63 and means for circulating the cooking air through the tunnel including a main conduit 65 and branch conduits 67, 69, 71, 73. Power driven fan means 75 mounted in main conduit 65 propel the cooking air through the conduit means and tunnel interior of the cooking unit (see FIG. 3). A main heating unit 77 preferably of the open flame heater type, and including a plurality of open flame burners 79, is fitted in main conduit 65 downstream from fan means 75. A burner valve control unit 81, and sensing unit 83 arranged in the downstream interior of cooking tunnel 63 and connected by lead line 85, provide heat sensing and control means for controlling the output of main heating unit 77 and temperature control within a desired range within the downstream portion of cooking tunnel 63.

Auxiliary heating units 87, 89, 91, 93 are fitted respectively in the outlet portion of branch conduits 67, 69, 71, 73. The auxiliary heating units each are functional for imparting additional heat to the air issuing from the respective conduits and for establishing zones of heat of different temperatures consecutively along the length of cooking tunnel 63. Auxiliary heating unit actuating means or heat control units 95, 97, 99, 101 responsive respectively to heat sensing elements 103, 105, 107, 109 are operative for obtaining and maintaining a desired heat range at each zone of cooking air in tunnel 63. Preferably, the zones of cooking air or temperature control for each zone is arranged for causing a progressively increasing temperature from the upstream (left end as viewed in FIG. 3) to the downstream portion (right end as viewed in FIG. 3) of the cooking tunnel.

Humidifying means or means for adding moisture to the cooking air includes steam line means 111 from a suitable steam source 112 and a plurality of steam nozzles opening into the interior of tunnel 63 including nozzles 113, 115, 117 preferably arranged respectively upstream adjacent the outlet openings respectively of branch conduits 69, 71, 73. Valve means 119, 121, 123 thermostatically controlled respectively by control and sensing elements 125, 127; 129, 131; and 133, 135 automatically control the steam issuing respectively from nozzles 113, 115, 117 and provide a desired humidity range for each cooking zone of tunnel 63. Humidity sensing elements 127, 131, 135 are arranged at longitudinally spaced intervals along the cooking tunnel interior and are adapted for sensing dry air conditions at the respective cooking zones. The humidity sensing and control means regulate the steam output of respective nozzles 113, 115, 117 and are mainly operative for introducing additional moisture to the cooking air when dry atmospheric conditions are in effect or the atmospheric air is of nominal moisture content.

The humidity control means of cooking unit 13 also preferably includes means for dehumidifying the cooking air when the atmospheric conditions are humid or the atmospheric air is of high moisture content. The dehumidifying means preferably include means for bypassing the cooking air passing through main conduit 65 through a cooling element 137 arranged upstream from main cooking air heating unit 77. A by-pass conduit 139 and a by-pass section 141 of main conduit 65 are arranged for parallel discrete air flows separated by a medial wall 143. A splitter type air valve 145 is pivotally hinged to the leading edge of medial wall 143 and is operative for proportioning relative flows of air through by-pass conduit 139 and by-pass section 141 of main conduit 65.

Automatically operative thermostatic control means including a sensing element 147 and an actuator unit 149 automatically control the pivotal position of by-pass valve 145; sensing element 147 arranged in the downstream portion of cooking tunnel 63; operative through actuator or control unit 149 actuates by-pass valve 145 and maintains the cooking air in the downstream portion of the tunnel within a desired cooking humidity range. Cooling element 137 preferably is in the form of a cooling coil connected to a suitable cooling unit, as cooling unit 151.

Conveyor means 153 of similar construction to cooling unit conveyor means 31, is operative for conveying the sausages through the cooking tunnel interior. Conveyor 153 is operative for conveying a series of parallel arranged sausage rods 33 from the cooking tunnel infeed portion 155 to the outfeed portion 157. Conveyor means 153 includes a pair of side rails 159 parallel supported each on opposite sides of the upper interior of cooking tunnel 63, a pair of pitman bars 161 parallel slidingly arranged respectively adjacent pair of side rails 159, a plurality of pairs of pawl mechanisms 163, supported respectively on pitman bars 161, and actuating means 165 for horizontally reciprocatingly moving pawl mechanisms 163. Pair of side rails 159 include upwardly facing coplanar arranged support surfaces 167 adapted to slidingly support respectively opposite end portions of series of sausage rods 33. Pair of side rails 159 include respectively U-sectioned lower portions 169 confrontingly arranged and defining slideway means for respective pitman bars 161. The pair of pitman bars are in face to face engagement with the interior confronting surfaces respectively of side rails 159 and are slidably supported in the upwardly facing U-sectioned lower portions 169 of side rails 159 (see FIGS. 7 and 8).

Each pawl mechanism 163 preferably includes a barlike pawl member 171 pivotally supported on horizontal pivot pin 173 along a respective inside surface 175 of a pitman bar 161. Each pawl member 171 is pivotally supported in an unbalanced disposition; each pawl member is normally gravitatingly moved to a vertical disposition and with its lower end portion 177 abuttingly engaging a stop block 179 fixedly secured on a pitman bar inside surface 175 (see FIGS. 7 and 8).

The action of a pawl member 171 is illustrated in FIG. 7. In the right-hand portion of FIG. 7 a pawl member 171 is shown as being pivotally moved clockwise as the pass surface 181 of the pawl member slidably engages a sausage rod 33 stationarily supported on support surface 167 of side rail 159. The left-hand portion of FIG. 7 illustrates pawl member 171 after it has passed underneath sausage rod 33 and has moved counterclockwise to a stopped position engaging stop block 179. The left-hand portion of FIG. 7 shows also the pawl member as pitman bar 161 moves toward the right and with check surface 183 of the pawl member engaging the sausage rod for causing sliding movement of the rod along support surface 167 of side rail 159.

The pitman bar supported pairs of pawl mechanisms 163 are reciprocatingly horizontally actuated and are operative for relaying a sausage rod successively intermittently from one pair of transversely spaced pawl members to a succeeding pair of pawl members and from infeed portion 155 to the outfeed portion 157 of the cooking unit. Each sausage rod 33 is adapted to be looped or draped with a chain of sausages S and moved through cooking tunnel 63 and through the several zones of cooking air in the cooking tunnel. The actuating means for pawl mechanisms 163 is similar to the actuating means for pawl mechanisms 45 of cooling unit 15 and includes a pair of bell crank wheels 185 fixedly secured on opposite ends of a horizontal shaft 187 which in turn is journalled in pair of bearings 189. Rocker arms 191 and link members 193 interconnect respectively bell crank wheels 185 and pitman bars 161 and communicate reciprocating motion to the pitman-bar-supported pawl mechanisms. Motor means 195 interconnected with bell crank shaft 187 through power transfer mechanism 197 drives bell crank wheels 185 for imparting the back and forth movement to the pairs of pawl mechanisms and for conveying the sausage rods through the cooking tunnel.

Cooking unit 13 preferably is arranged at an elevation above the elevation of cooling unit 15 and with the outfeed portion 157 of the cooking unit being arranged substantially directly over infeed portion 35 of cooling unit 15. Third conveyor 23 preferably is provided for lowering the sausage loaded rods from the outfeed end of the cooking unit to the infeed end of the cooling unit and for depositing the sausage laden rods in the cooling liquid M contained in tank 29. Lowering conveyor 23 preferably includes two pairs of intermittently operative fingers including an upper pair of fingers 201 and a lower pair of fingers 203. The upper and lower pairs of fingers are relatively vertically fixed together by a vertical plate 205 which in turn is guidingly constrained in a vertical parallel arranged pair of guide rods 207. Upper and lower pairs of fingers 201, 203 are adapted to be simultaneously equidistantly moved upwardly and downwardly in guidingly constrained movement by the pair of guide rods 207. Power and motion transmitting means 209 (schematically shown) impart vertical reciprocating movement to fingers 201, 203 through vertical plate 205. The upper and lower pairs of fingers 201, 203 are adapted to intermittently engage and downwardly relay a sausage rod from an upper station 211 to an intermediate station 213 and then to a lower station 215 arranged in the infeed end of cooling tank 29.

FIG. 10 schematically illustrates the intermittent sequential action of fingers 201, 203 in lowering a sausage rod from the cooking tunnel to the cooling tank. Three pairs of transversely spaced stationary supports 217, 219, 221 define respectively upper, intermediate and lower stations 211, 213, 215. Upper pair of stationary supports 217 preferably are defined by the outfeed terminal end portions respectively of cooking unit side rails 159. Intermediate pair of supports 219 are supported in transversely spaced arrangement respectively from vertical parallel standards 223. Pair of intermediate supports 219 preferably each are provided with upwardly concave surfaces adapted to cradle and temporarily support a horizontal sausage loaded sausage rod 33. Pair of lower supports 221 preferably are defined by the leading infeed terminal portions respectively of cooling unit side rails 41.

Vertically reciprocating fingers 201, 203 also are horizontally reciprocatingly movable. An upper set of cam surfaces 225, 227, 229, 231 and a lower set of cam surfaces 233, 235, 237, 239 are associated respectively with upper pair of fingers 201 and lower pair of fingers 203 (see FIG. 10). A left and a right set of cam surfaces 225, 227, 229, 231 are adapted to coact respectively with pair of upper fingers 201 and provide horizontal movement of upper pair of fingers 201 in response to vertical reciprocation of finger supporting carriage plate 205. Left and right lower sets of cam surfaces 233, 235, 237, 239 likewise are associated respectively with the left and right fingers of pair of fingers 203 and in response to vertical reciprocation of carriage plate 205 causes horizontal reciprocation of lower pair of fingers 203.

FIG. 10 illustrates schematically the paths of cam followers 241, 243 actuating respectively upper and lower fingers 201, 203. As indicated by the arrows in FIG. 10, it will be noted that the path of movement respectively of upper and lower cam followers 241, 243 each are generally in a figure "8" configuration. Moreover, in the schematic showing of FIG. 10, it will be noted that cam surfaces 229, 231 of the upper set of cam surfaces and cam surfaces 233, 235 of the lower set of cam surfaces are spaced apart and also intermediate stationary supports 219 are shown in both the upper and lower sets of cam surfaces. Such a showing is for purposes of clarity in description and it will be understood that third conveyor 23 includes only one stationary support 219 and that the paths of movement respectively of upper and lower cam followers 241, 243 overlap adjacent intermediate stationary support 219, as viewed from the side, as in FIG. 10. The upper set of cam surfaces 225, 227, 229, 231 are offset laterally or outwardly, as viewed from above, from lower set of cams 233, 235, 237, 239 so that there will be no conflict between the cams. For purposes of clarity, the cam surfaces have been omitted from FIGS. 1 and 2, but the cams may be mounted from any suitable supporting structure so that the cam followers 241, 243 will engage the cam surfaces at the appropriate places. Since the upper and lower cam surfaces are offset laterally, as viewed from above, the pairs of fingers 201, 203 are also offset laterally, as will be best seen in FIG. 1. It will be understood that the timing of the motion transmitting means 209 in its up or down movement should be coordinated with the cam surfaces so that at the appropriate times the fingers 201, 203 and cam followers 241, 243 will be moved upwardly or downwardly. For example, assuming that the cam follower 241, as seen in solid lines in FIG. 10, is moving upwardly from the position shown in solid lines, when it reaches the cam surface 225, the finger 201 will be moved to the right because of the camming action of the cam surface 225 on follower 241 while the motion transmitting means 209 is moving the finger 201 and cam follower 241 upwardly. When the cam follower 241 reaches the position shown in dotted lines in FIG. 10, the motion transmitting means 209 will be timed so that it causes the finger 201 and the cam follower 241 to move vertically downwardly until the cam surface 227 is engaged by the cam follower 241 which will cause the finger 201 to move inwardly or to the left as viewed in FIG. 10. The motion transmitting means will then carry the finger and cam follower 241 vertically downwardly from the left end portion of cam surface 227 until the cam surface 229 is engaged by the cam follower which will cause the finger 201 and the cam follower 241 to move outwardly or to the right as viewed in FIG. 10. The motion transmitting means 209 is coordinated so that when the cam follower 241 reaches a position adjacent the right end of cam surface 229, the motion transmitting means will cause the finger 201 and cam follower to move vertically upwardly until cam surface 231 is engaged by the cam follower 241, which will cause the finger 201 and cam follower 241 to move inwardly. The finger 201 and cam follower 241 will then be raised vertically upwardly and the cycle repeated. The reason for the above described somewhat figure "8" motion is so that the rod 33 after being picked up from station 217 and on the downward stroke will by-pass the ends of the rails 159 and then be moved back into position to engage station 219. Then, on the upward stroke the fingers 201 will be back in a position to pick up another rod 33 from station 217.

Conveyor 23 is adapted to lower a sausage rod 33 from upper supports 217 by upper pair of fingers 201 and deposit the rod on intermediate support 219. Lower pair of fingers 203 is adapted to remove sausage rod 33 from intermediate support 219 and lower and deposit the rod on lower support 221. Each sausage rod conveyed through cooking tunnel 63 is adapted to be relayed downwardly from the outfeed end portion of the cooking tunnel by lowering conveyor 23 and the series of sausage rods to be successively deposited in the infeed end portion of cooling unit tank 29.

Fourth conveyor 25, similar to third conveyor 23, is provided for raising the sausage rods from linker-stuffer machine 11 to the infeed portion of cooking unit 13. Conveyor 25 includes lower and upper pairs of fingers 247, 249 supported on a vertical carriage plate 251 which in turn is guidingly constrained in vertical reciprocating movement on vertical guide rods 253. Conveyor 25 includes a lower pair of stationary supports 255, an intermediate pair of supports 257, and an upper pair of supports 259 defining substantially three vertically spaced stations for receiving temporarily a sausage rod 33. Power and motion transmitting means 261 (indicated schematically in FIG. 2) provide actuating means for vertical reciprocating movement of upper and lower pairs of fingers 247, 249. Left and right lower sets of cam surfaces 263, 265, 267, 269 and left and right upper sets of cam surfaces 271, 273, 275, 277 coact respectively with lower and upper pairs of cam followers 279, 281 operative respectively for horizontal reciprocating movement of lower and upper pairs of fingers 247, 249. FIG. 9 illustrates the lower and upper sets of cam surfaces and the paths respectively of lower and upper cam followers 279, 281 in a vertically spaced disposition. It will of course be understod that the paths respectively of cam followers 279, 281 overlap as viewed from the side, as in FIG. 9, and also only a single intermediate pair of stationary supports 257 is included in conveyor 25. The spaced apart illustration of the upper and lower sets of cam surfaces is for purposes of clarity in description. The upper set of cam surfaces 271, 273, 275, 277 are offset laterally or outwardly, as viewed from above, from lower set of cams 263, 265, 267, 269 so that there will be no conflict between the cams. For purposes of clarity, the cam surfaces have been omitted from FIGS. 1 and 2, but the cams may be mounted from any suitable supporting structure so that the cam followers 279, 281 will engage the cam surfaces at the appropriate places. Since the upper and lower cam surfaces are offset laterally, as viewed from above, the pairs of fingers 247, 249 are also offset laterally, as will be best seen in FIG. 1. It will be understood that the timing of the motion transmitting means 261 in its up or down movement should be coordinated with the cam surfaces so that at the appropriate time the fingers 247, 249 and cam followers 279, 281 will be moved upwardly or downwardly. For example, assuming that the cam follower 281, as seen in solid lines in FIG. 9, is moving upwardly from the position shown in this figure, when it reaches the cam surface 275, the finger 249 will be moved to the left because of the camming action of the cam surface 275 on follower 281 while the motion transmitting means 261 is moving the finger 249 and cam follower 281 upwardly. When follower 281 engages cam surface 273, the follower 281 and finger 249 will be moved to the right as viewed in FIG. 9. When the cam follower 281 reaches the position shown in dotted lines in FIG. 9, the motion transmitting means 261 will be timed so that it causes the finger 249 and the cam follower 281 to move vertically downwardly until the cam surface 271 is engaged by the cam follower 281 which will cause the finger 249 to move to the left as viewed in FIG. 9. The motion transmitting means will then carry the finger and cam follower 281 vertically downwardly from the left end portion of cam surface 271 until the cam surface 277 is engaged by the cam follower which will cause the finger 249 and the cam follower 281 to move to the right as viewed in FIG. 9. The motion transmitting means 261 is coordinated so that when the cam follower 281 reaches a position adjacent the right end of cam surface 277, the motion transmitting means will cause the finger 249 and cam follower 281 to move vertically upwardly and the cycle repeated.

In the operation of conveyor 25, a sausage-chain-draped sausage rod 33 is removed from linker-stuffer machine 11 by a workman and deposited on lower pair of supports 255. Reciprocating movement of lower pair of fingers 247 engages the sausage rod and relays it to a deposited disposition on intermediate pair of supports 257. Upper pair of fingers 249 in horizontal and vertical reciprocating movement engages the sausage rod and removes it from intermediate pair of supports 257 and deposits it on upper pair of supports 259 and into the infeed portion of cooking unit 13.

Rectangular box-like downwardly opening shrouds 283, 285 are fitted respectively over the upper portions of vertical conveyors 23, 25 and respectively at the infeed and outfeed portions of the cooking unit tunnel 63. Infeed and outfeed shrouds 283, 285 substantially enclose opposite end portions of the cooking tunnel and generally cause the cooking air to flow through the tunnel and heating means of the cooking unit in a recirculatory flow of air.

Sausage rod transfer means 27 is adapted to transfer successively the sausage rods from the infeed side of peeling machine 17 to the outfeed side of linker-stuffer machine 11. The sausage rod transfer means 27 includes a downwardly slanted sausage rod conveying tube 287 and a suitable vibrating element 289, driven by electricity or other suitable power, fixedly secured on tube 287 for causing the suasage rods to convey downwardly through the tube by vibrating the tube through element 289. A workman attending peeling machine 17 removes a sausage chain from a sausage rod 33 and feeds the rod endwise through conveying tube 287. The workman attending linker-stuffer machine 11 removes the sausage rod from the discharge end of the tube and drapes the sausage chain issuing from linker-stuffer machine 11 over the sausage rod and deposits the rod on lower pair of supports 255 of conveyor 25. A certain number of sausage rods 33 are substantially continuously being utilized in the sausage processing apparatus and the same sausage rods are utilized cyclically substantially throughout the full sausage processing procedure. Sausage rod transfer means 27 preferably includes means for cleaning the sausage rod as it is being vibrationally conveyed through sausage rod conveying tube 287. Live steam injected into tube 287 through steam lines 291 preferably provide means for sterilizing and cleaning the sausage rods. A drain conduit 293 having an inlet 295 in tube 287 drains the steam condensate from the tube for disposal. Chemical detergent dispensing means, not shown, preferably introduces chemical detergent in steam lines 291 for further cleaning action on the sausage rods conveyed through the conveying tube.

We claim:
1. Link sausage cooking apparatus comprising a plurality of long sausage rods with each rod being adapted to support a chain of link sausages and the like draped over said rod, a long horizontally extending cooking tunnel having interior wall structure defining substantially an unrestricted horizontally extending tunnel passageway, heat and humidity control means for conditioning the air in said tunnel passageway including air recirculating conduit means for recirculating air through said tunnel passageway including a main conduit having an inlet opening in the downstream portion of said tunnel, a plurality of branch conduits each having an inlet communicating with the main conduit and an outlet communicating with the interior of said tunnel passageway, main air heater means interposedly arranged in said main conduit arranged upstream from the inlets of said branch conduits for heating the air passing through said branch conduits, fan means for propelling the air through said main conduit and branch conduits and said cooking tunnel passageway in a cyclic or recirculatory flow of air, a plurality of auxiliary heating units including at least two heating units arranged in respective two branch conduits for imparting additional heat to the air passing through said two branch conduits and for establishing cooking zones of different temperatures in the longitudinal extension of said cooking tunnel, and including conveyor means for conveying the sausage bearing rods through said cooking passageway from the infeed end to the outfeed end of said cooking tunnel.

2. The apparatus of claim 1 wherein said conveyor means includes left and right side rails supported parallel and on the upper interior of said tunnel passageway, and with said side rails being adapted to support said plurality of sausage rods in a parallel arranged series of rods extending transversely of said cooking tunnel and including a series of pairs of pawl mechanisms arranged in a series extending longitudinally in said passageway, with the pawl mechanisms of each pair being arranged adjacent respective left and right side rails, and including actuating means for horizontally reciprocatingly moving said series of pawl mechanisms in unison for relaying a sausage rod successively intermittently from a first pair of pawl mechanisms to a succeeding pair of pawl mechanisms and from the infeed to the outfeed portion of said cooking tunnel.

3. The sausage cooking apparatus of claim 2 wherein said cooking tunnel includes a successively arranged series of heat and humidity controlled zones substantially with each zone being arranged adjacent an auxiliary heating unit, and wherein each zone includes steam nozzle means for introducing moisture into each zone, and includes heat range sensing and control means operable through said auxiliary heating unit for controlling the heat range of each zone and including humidity range sensing and control means responsive to humidity content in each zone and operative for controlling the steam or moisture issuing from each steam nozzle of each heat and humidity control zone.

4. The apparatus of claim 2 wherein means is provided for increasing the temperature of the cooking air along the length of said cooking tunnel from adjacent the infeed end thereof towards the outfeed end thereof.

5. In link sausage processing apparatus the apparatus for sequentially cooking and cooling a linked sausage chain comprising a plurality of long sausage rods each rod being adapted to support a chain of link sausages and the like draped over the rod, a cooking unit including wall structure defining a long horizontally extending cooking tunnel having interior wall surfaces defining substantially an unrestricted horizontally extending tunnel passageway, heat and humidity control means for heating and conditioning the air in said tunnel passageway including air circulating conduit means for recirculating air through said tunnel interior including main conduit means having an inlet opening in the downstream portion of said cooking tunnel, a plurality of branch conduits each having an inlet communicating with the main conduit and an outlet communicating with the interior of said tunnel, the plurality of branch conduit outlets opening into the interior of said tunnel at longitudinally spaced intervals along said tunnel passageway, main air heater means interposedly arranged in said main conduit generally upstream from said branch conduit inlet openings for heating the air passing through said branch conduits and into the interior of said tunnel, fan means for propelling the air through said main conduit and said branch conduits, auxiliary heating unit means arranged in said branch conduits and in at least two of said conduits for imparting additional heat to the air passing through said conduits into the interior of said tunnel passageway, sensing element means arranged in said tunnel interior for sensing the range of heat in said tunnel, and means responsive to the sensing element means for regulating the heat output of the auxiliary heating unit means at each branch conduit and substantially creating zones of air of different temperatures in the tunnel interior, first conveyor means for conveying the sausages through said cooking unit tunnel, a cooling unit including a long horizontally extending tank adapted for containing cooling liquid, said tank having an infeed and an outfeed portion, second conveying means for conveying the sausages through said cooling liquid from said infeed portion to said outfeed portion, the sausages being moved through said cooking unit by said first conveyor and through said cooling unit by said second conveyor.

6. The apparatus of claim 5 which additionally includes humidity control means including means for dehumidifying the air passing through said cooking tunnel including a by-pass conduit having an inlet and an outlet opening at spaced intervals opening into the main conduit, a by-pass section in said main conduit disposed between the inlet and outlet openings of said by-pass conduit, said by-pass conduit including cooling element means in said interior of said by-pass conduit and means for energizing said cooling element means for removing moisture from the air passing through said by-pass conduit, and including by-pass valve means for proportioning the amount of air flowing through said by-pass conduit relative to the amount of air flowing through the by-pass section of said main conduit means.

7. The apparatus of claim 6 wherein said means for dehumidifying the air passing through said cooking tunnel additionally includes automatically operatve thermostatic switch means including a sensing element arranged in the interior of said tunnel for sensing air of high humidity conditions in said tunnel and including actuator means responsive to signals emitted by said sensing elements for controlling the movement of said by-pass valve to a position proportioning relative amounts of air passing through said by-pass conduit and said by-pass section of said main conduit.

8. The apparatus of claim 7 wherein said humidity control means includes means for humidifying the air passing through said cooking tunnel including a plurality of nozzles opening into the interior of said tunnel passageway at longitudinally spaced intervals along said tunnel passageway, means for furnishing pressured steam through said nozzles into the tunnel interior including steam line means for conducting steam into each nozzle and including steam valve means interposedly fitted in respective steam line means of each nozzle for regulating the passage of steam through each nozzle.

9. The apparatus of claim 8 wherein said means for humidifying the air passing through said cooking tunnel additionally includes automatically operative thermostatic switch means operative for opening and closing the steam valve means of each steam line and includes a plurality of sensing elements arranged at longitudinally spaced intervals along said tunnel interior for sensing a dry air condition and including actuator means for each steam valve means responsive to signals emitted by a sensing element of said plurality of sensing elements for controlling the opening and closing of each steam valve and for humidifying the cooking air in said tunnel to a certain range of humidity.

10. The apparatus of claim 9 wherein the cooking air in said tunnel is sequentially treated as it moves from the upstream to the downstream portion of said tunnel and wherein said tunnel is substantially arranged in a series of cooking zones sequentially arranged substantially throughout the length of said tunnel, at least a plurality of the zones of said cooking tunnel each including a branch line outlet including auxiliary heating unit means, heat sensing element means and steam nozzle and humidity sensing element means.

11. The apparatus of claim 5 which additionally includes third conveyor means for conveying the linked sausages from the outfeed portion of said cooking unit to the infeed portion of said cooling unit.

12. The apparatus of claim 5 wherein said cooking unit is arranged at an elevation above the elevation of said cooling unit and wherein said outfeed portion of said cooking unit is arranged substantially directly over the infeed portion of said cooling unit and in which the apparatus additionally includes third conveyor means for lowering the sausages from the outfeed portion of said cooking unit to the infeed portion of said cooling unit.

13. The apparatus of claim 12 wherein said first conveyor means includes a pair of side rails extending longitudinally along opposite sides of said cooking tunnel and with said side rails being adapted to support in parallel spaced relationship a series of sausage rods transversely arranged and at intervals along the length of said cooking tunnel and with each rod being supported at opposite end portions thereof on said pair of side rails and bridgingly arranged across said side rails, and wherein said first conveyor means includes a longitudinally spaced series of pairs of pawl mechanisms, each pair of pawl mechanisms being adapted to simultaneously engage a sausage rod at opposite end portions of said rod, and including means for horizontally reciprocating said series of pairs of pawl mechanisms in unison, a sausage chain loaded sausage rod being operatively relayed successively intermittently from one pair of pawl mechanisms to a succeeding pair of pawl mechanisms and from the infeed portion to the outfeed portion of said cooking unit.

14. The apparatus of claim 13 wherein said second conveyor means in said cooling tank unit is substantially of the same construction as said first conveyor means and includes a series of pairs of pawl mechanisms and means for horizontally reciprocating said pairs of pawl mechanisms in unison, and includes means for relaying a sausage rod successively intermittently from one pair of pawl mechanisms to a succeeding pair of pawl mechanisms and from the infeed to the outfeed portion of said cooling unit.

15. The apparatus of claim 14 wherein said third conveyor means includes at least three vertically spaced stationary stations including an upper, a lower and an intermediate station, each stationary station including a horizontally aligned pair of stationary supports adapted to supportingly engage a sausage rod at opposite end portions of the rod, and including at least two pairs of movable fingers including an upper and a lower pair of fingers with each pair of fingers being in horizontally aligned configuration, said two pairs of fingers being vertically spaced apart, means for moving said two pairs of fingers vertically reciprocatingly generally along a vertical plane lying adjacent said stationary stations, and including cam means operatively responsive to vertical reciprocating movement of said pairs of fingers for causing horizontal reciprocating corresponding movement of each pair of fingers, said third conveyor being adapted to lower a sausage rod from the outfeed portion of said cooking unit to the infeed portion of said cooling unit by the sequential actions, the upper pair of fingers removing a sausage rod from the supports of said upper station and lowering the sausage rod to said intermediate station, and then said lower pair of fingers removing said sausage rod from said intermediate station and lowering the sausage rod to the pair of stationary supports of said lower station.

16. The apparatus of claim 15 which additionally includes a fourth conveyor means for conveying sausage rods from an elevation beneath said cooking to the infeed portion of said cooking unit and wherein said fourth conveyor means is of similar construction to said third conveyor means but operative for raising by intermittent vertical reciprocating movement a sausage rod to the infeed portion of said cooking unit, said fourth conveyor means including at least three stations including an upper, a lower, and an intermediate station, each station including a pair of stationary supports horizontally aligned and vertically spaced apart from an adjacent station, each pair of stationary supports being adapted to supportingly engage a sausage rod at opposite end portions of the rod, the fourth conveyor means including at least two pairs of movable fingers including an upper pair and a lower pair of fingers with each pair of fingers being horizontally aligned and with said two pairs of fingers being vertically spaced apart, means for moving said fingers vertically reciprocatingly correspondingly generally along a vertical plane lying adjacent said upper, lower and intermediate stations, cam means operatively responsive to vertical reciprocating movement of said pairs of fingers for causing horizontal reciprocating corresponding movement of each pair of fingers, said fourth conveyor means being adapted to raise a sausage rod from said lower station by said lower pair of fingers and to place the sausage rod on said intermediate station and to raise the rod by said upper pair of fingers from said intermediate station to the upper station at the infeed portion of said cooking unit.

References Cited

UNITED STATES PATENTS

| | | | |
|---|---|---|---|
| 2,789,914 | 4/1957 | Davis | 99—261 |
| 3,255,689 | 6/1966 | Kielsmeier | 99—261 |
| 3,288,054 | 11/1966 | Weprin | 99—261 |
| 3,125,017 | 3/1964 | Tauber | 99—443 |
| 3,276,352 | 10/1966 | Allen | 99—443 |

ROBERT W. JENKINS, Primary Examiner

U.S. Cl. X.R.

99—352